United States Patent Office 3,514,377
Patented May 26, 1970

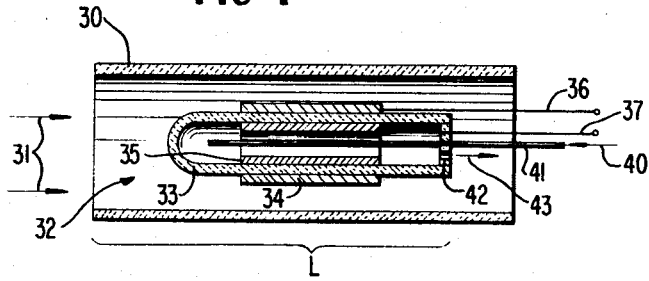
FIG 1
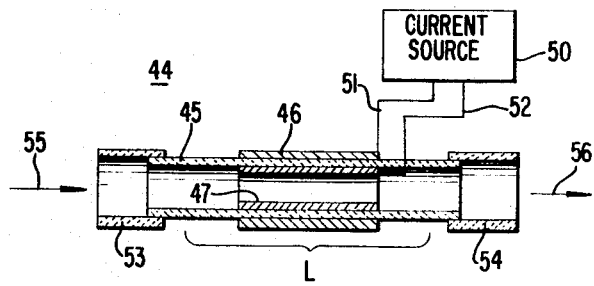
FIG 2
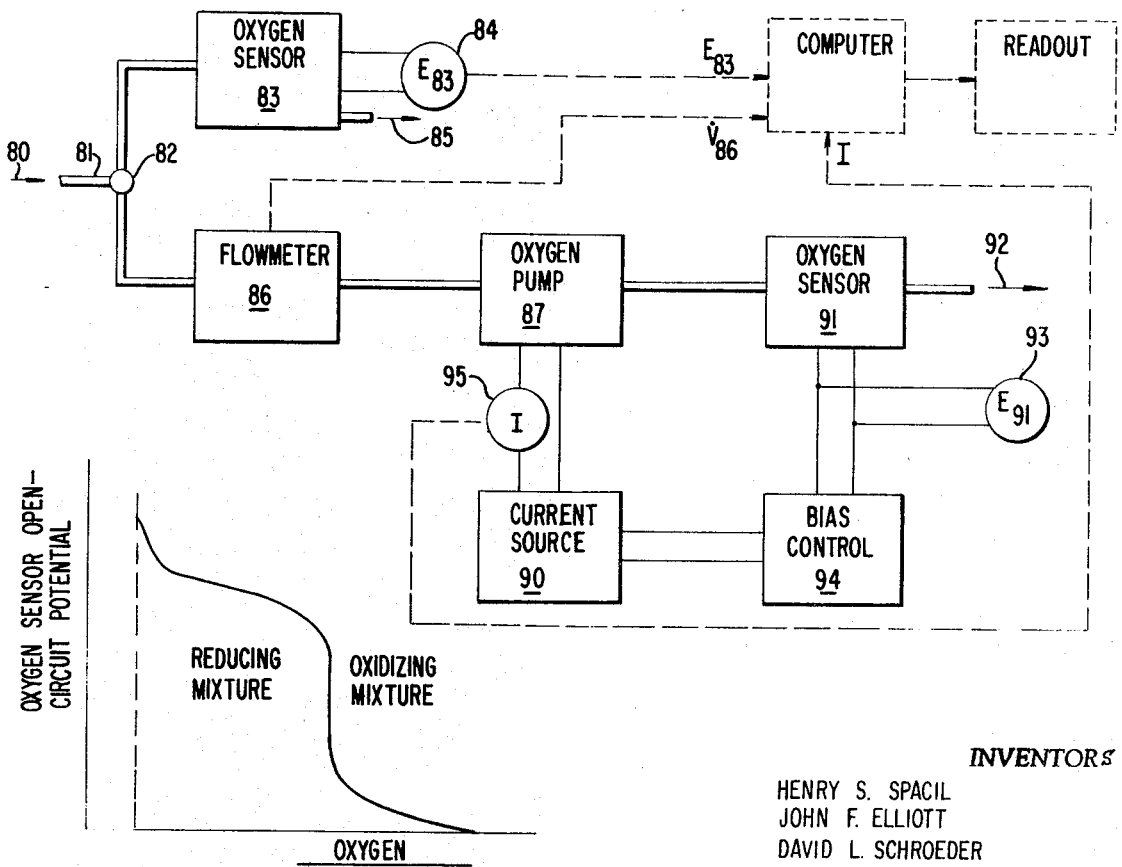
FIG 4
FIG 3
INVENTORS
HENRY S. SPACIL
JOHN F. ELLIOTT
DAVID L. SCHROEDER
DONALD W. WHITE, JR.
BY George A. Herbster
ATTORNEY

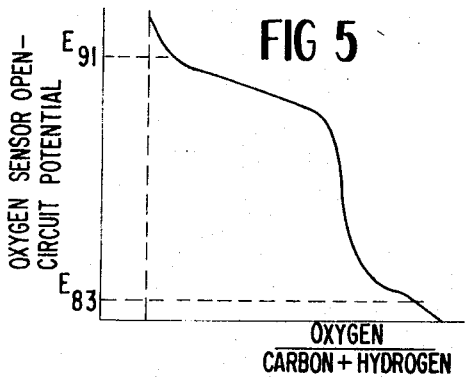
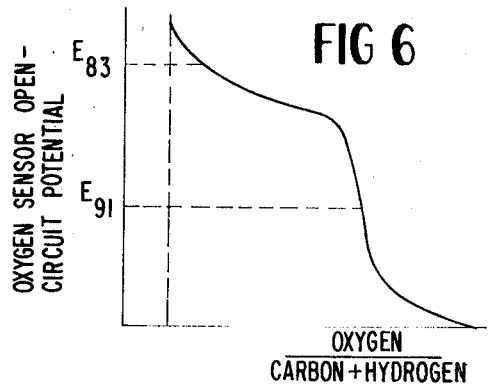
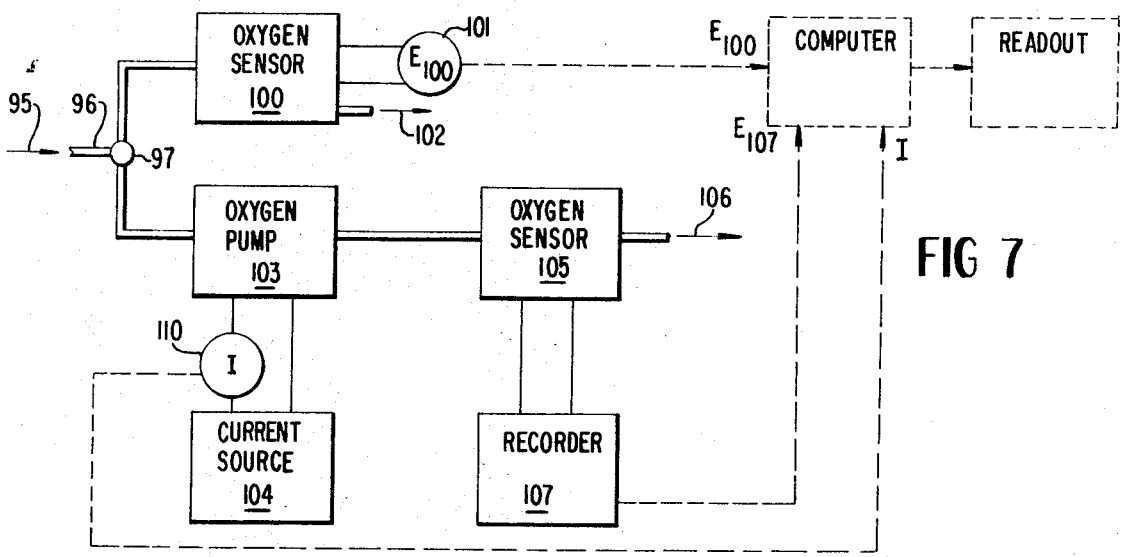
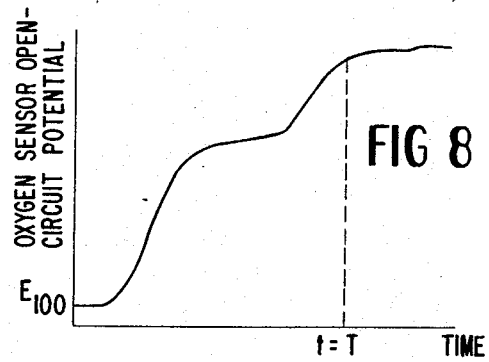
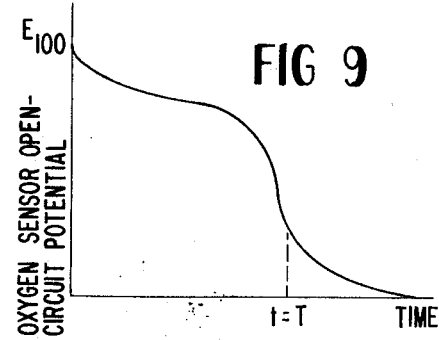
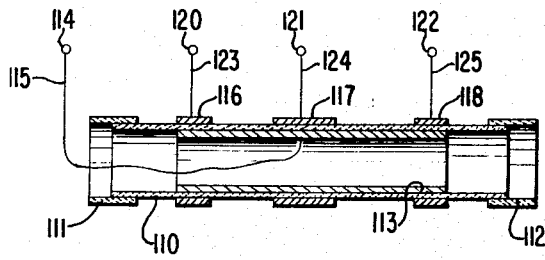

3,514,377
MEASUREMENT OF OXYGEN-CONTAINING GAS COMPOSITIONS AND APPARATUS THEREFOR
Henry S. Spacil, Schenectady, N.Y., John F. Elliott, Winchester, Mass., and David L. Schroeder, Schenectady, and Donald W. White, Jr., Burnt Hills, N.Y., assignors to General Electric Company, a corporation of New York
Filed Nov. 27, 1967, Ser. No. 685,869
Int. Cl. B01k 3/00
U.S. Cl. 204—1      18 Claims

ABSTRACT OF THE DISCLOSURE

A method and system for analyzing gas mixtures including constituents taken from the group consisting of carbon monoxide, carbon dioxide, oxygen, hydrogen, water vapor and a diluent. A first, voltage-producing solid oxygen-ion electrolyte oxygen sensor determines whether the gas mixture is oxidizing or reducing. A current-operated solid oxygen-ion electrolyte pump and a second oxygen sensor coact to vary the mixture's oxidizing or reducing characteristics. Measurements of voltages, current and either gas flow in continuous analysis or time in batch analysis permit accurate determination of the mixture's composition.

BACKGROUND OF THE INVENTION

This invention relates to gas analysis and more particularly to a method and system for determining the composition of certain gaseous mixtures.

In some industrial processes it is necessary or desirable to analyze associated gases to determine process characteristics. For example, the exhaust gases in a basic oxygen furnace hood can be analyzed as a function of time to indicate the carbon loss from the melt. Several prior art systems have attempted to analyze the oxygen content of industrial gases. However, in most systems it was not possible to obtain a direct oxygen indication. In still others complete determination of all the constituents to include diluent gases was not possible. Still other systems for providing partial analysis required extensive gas cleaning because these systems were sensitive to foreign matter. Furthermore, constant calibration and recalibration procedures were required.

Therefore, it is an object of this invention to provide a gas analysis system and method for certain oxygen-containing gaseous mixtures.

Another object of this invention is to provide a gas analysis system and method for accurately determining the composition of gaseous mixtures including constituents taken from the group consisting of carbon monoxide, carbon dioxide, oxygen, water vapor, hydrogen and a diluent.

Still another object of this invention is to provide a gas analysis system and method which indicates the total oxygen content directly.

Yet another object of this invention is to provide a gas analysis system and method which is relatively insensitive to foreign matter and which requires minimal calibration.

Yet still another object of this invention is to provide a gas analysis system and method wherein determination of the diluent content is provided.

SUMMARY

In accordance with one aspect of this invention, a gaseous mixture having constituents taken from the group consisting of carbon monoxide, carbon dioxide, oxygen, hydrogen, water vapor and a diluent gas is initially analyzed in a solid oxygen-ion electrolyte oxygen sensor to ascertain its reducing or oxidizing characteristics and is then titrated. Measurements of system parameters are manipulated to accurately indicate the mixture composition.

This invention has been pointed out with particularity in the appended claims. A more thorough understanding of the above and further objects and advantages of this invention may be had by referring to the following detailed description taken in conjunction with the drawings.

BRIEF DESCRIPTION OF THE DRAWINGS

FIG. 1 illustrates constructional features of an oxygen sensor;
FIG. 2 illustrates essential construction features of an oxygen pump;
FIG. 3 is a graph useful in understanding this invention;
FIG. 4 is a schematic representation of a continuous flow gas analysis system embodying this invention.
FIG. 5 is a graph for understanding the operation of the continuous flow analysis system as applied to an oxidizing gas;
FIG. 6 is a graph for understanding the operation of the continuous flow analysis system as applied to a reducing gas;
FIG. 7 is a schematic representation of a batch gas analysis system embodying this invention;
FIG. 8 is a graph for understanding the operation of the batch analysis system as applied to an oxidizing gas;
FIG. 9 is a graph for understanding the operation of the batch analysis system as applied to a reducing gas; and
FIG. 10 illustrates one embodiment of a single device incorporating two oxygen sensors and one oxygen pump particularly adapted for the systems represented in FIGS. 4 and 7.

DESCRIPTION OF THE PREFERRED EMBODIMENTS

Two essential components of the gas analysis system constructed in accordance with this invention are a solid oxygen-ion electrolyte oxygen sensor and a solid oxygen-ion electrolyte oxygen pump. Therefore, a summary analysis of each component will facilitate an understanding of this invention. However, it will be obvious to those skilled in the art that any construction of a solid oxygen-ion electrolyte device providing the necessary analysis information may be substituted for these particular embodiments.

A solid oxygen-ion electrolyte oxygen sensor embodiment illustrated in FIG. 1 comprises an enclosure such as a clyindrical housing 30 through which a stream of gas to be analyzed, as represented by the arrows 31, may flow continuously or intermittently. Housing 30 is made of a ceramic or refractory material as normal operating conditions require the housing to be exposed to temperatures in excess of 650° C. Necessary heating to achieve these operating temperatures may be supplied by external ambient atmospheses, by the gas being analyzed or more generally, by a suitable heating unit (not shown) mounted) on the housing 30 over the length L as indicated in the drawing.

A cell 32, having a solid oxygen-ion electrolyte 33 with an external electrode 34 and an internal electrode 35 mounted thereto, is stiuated within the housing 30 so that the gas stream 31 contacts the electrolyte 33 and the external electrode 34. A lead 36 is connected to the external electrode 34; and the lead 37, to the internal electrode 35.

A reference gas of known oxygen content represented by an arrow 40 is introduced into the interior of the cell 32. For example, a commercially available gas may be passed into the cell 32 through a tube 41. If the ambient atmosphere composition is stable, it may be used as a reference gas. After contacting the internal electrode 35 and the electrolyte 33 adjacent thereto, the reference gas may be vented through a port 42 in a cell end wall downstream from the external electrode 34 as represented by the arrow 43. Other means may also be used to provide a reference gas for the cell 32.

Electrolyte 33 is composed of a solid oxygen-ion electrolyte such as calcia-, scandia-, ytterbia-, or yttria-stabilized cubic zirconia. Electrodes 34 and 35 are preferably formed of porous platinum because platinum withstands both the oxidizing and reducing gasses encountered in gas analysis.

As is known, the solid oxygen-ion electrolyte, when heated to an operating temperature in excess of 650° C., preferably to 850° C., produces an open circuit potential between the electrodes 34 and 35 because there is a gradient of oxygen ions through the electrolyte. This potential is a function of the difference in oxygen partial pressures for the gas contacting the internal electrode 35 and the gas contacting the external electrode 34. If $(X_{O_2})_S$ and $(X_{O_2})_R$ represent the mol fractions of oxygen in the gas being alalyzed and the reference gas respectively, if $P_S$ and $P_R$ are the total pressures of the gases, if E is the open-circuit potential between the electrodes 34 and 35, and if $k$ is a constant determined by the oxygen sensor operating temperature, the following mathematical relationship exists:

(1) $\quad \log [P_S(X_{O_2})_S] = \log [P_R(X_{O_2})_R] + E/k$

If the oxygen sensor is operated at 850° C. and E is measured in volts, $k$ is 0.0577.

The solid oxygen-ion electrolyte oxygen pump 44 illustrated in FIG. 2 comprises a tube 45 which may be formed from one of the oxygen sensor solid oxygen-ion electrolytes. An external electrode 46 and an internal electrode 47 preferably composed of porous platinum and affixed to the electrolyte tube 45 are coupled to a current source 50 by leads 51 and 52. While the current source 50 electrically energizes the oxygen pump 44, thermal energy, which may be supplied by heater means disposed adjacent the oxygen pump 44 over the length L, maintains the oxygen pump 44 in an operating range in excess of 650° C. The gases being analyzed may also be used for heating to obviate the requirement for a distinct heater.

Couplings 53 and 54 are exemplary of means for connecting the oxygen pump 44 so that the only gas contecting the interior of the electrolyte tube 45 and the internal electrode 47 is the gas to be analyzed. In such a construction ambient atmosphere may be used to contact the external electrode 46 and the electrolyte tube 45 eliminating the requirement for a housing means such as that shown with the oxygen sensor. If a separate gas source is required for the external electrode 46, a structure such as that shown in FIG. 1 could be adapted for use with the oxygen pump shown in FIG. 2. Similarly the construction of the oxygen pump 44 can be adapted for use as an oxygen sensor when a separate reference gas is not necessary.

The current source 50 generates a reversible polarity direct current. When the direct current souce 50 is energized so that the external electrode 46 is polarized positive, oxygen is "pumped" through the electrolyte as oxygen ions to the ambient atmosphere from the gas being analyzed. Reversing the polarization causes oxygen to be pumped as oxygen ions from the ambient atmosphere to the gas being analyzed in the interior of the oxygen pump. Therefore, when the current source 50 is energized, the composition of the gas entering the pump designated by arrow 55 differs from that of the exit gas designated by arrow 56. Proper current polarity and magnitude control permits the oxygen pumping direction and rate to be determined and controlled.

Previously, it was noted that the system forming this invention was capable of determining the exact composition of a gas mixture including the constituents taken from the group consisting of carbon monoxide, carbon dioxide, oxygen, hydrogen, water vapor and a diluent. However, as will be obvious to those skilled in the art, significant mol fractions of all these constituents cannot exist simultaneously at temperatures above 650° C. Therefore, a gas mixture which is neutral, oxidizing or reducing must result. For example, a mixture of hydrogen, water vapor, carbon monoxide, carbon dioxide and a diluent constitutes a reducing gas mixture while carbon dioxide, oxygen and water vapor constitute an oxidizing mixture. Molecular oxygen in significant quantities cannot exist in a reducing atmosphere and neither carbon monoxide nor hydrogen can exist in significant quantities is an oxidizing atmosphere. However, some very small, but measurable quantities of molecular oxygen do exist in reducing gases. It will also be evident that a reducing gas has a lower oxygen-to-carbon-plus-hydrogen ratio (hereinafter $O/CH$ ratio) than does an oxidizing gas.

When certain gaseous mixtures are analyzed, it is necessary to know the atomic ratio of carbon to hydrogen (hereinafter the $C/H$ ratio). If combustion products from a burning fuel are being analyzed, knowledge of the fuel composition provides the $C/H$ ratio. For example, when methane ($CH_4$) is burned in air, the $C/H$ ratio for the combusted gases is the 0.25. For most gas composition, the $C/H$ ratio is easily determined. In other gas mixtures either the hydrogen or carbon is absent so that knowledge of $C/H$ ratio is not necessary.

Now referring to FIG. 3, the sensor output voltage is plotted as a function of the $O/CH$ ratio when ambient atmosphere is used as a reference. The voltage reaches a maximum at a minimum value of the $O/CH$ ratio, which may be expressed in terms of a $C/H$ ratio as $(C/H)/(1+C/H)$. At this minimum value the gas mixture consists almost entirely of carbon monoxide, hydrogen and diluent and is reducing. The $O/CH$ ratio can increase, indicating the gas mixture may consist of carbon monoxide, carbon dioxide, hydrogen, water vapor and the diluent until it reaches a value at which the sensor output voltage drops rapidly. This value may be expressed as $(.5+2C/H)/(1+C/H)$. At this voltage drop the gas mixture consists almost entirely of carbon dioxide, water vapor and a diluent and is neutral. Above this $O/CH$ ratio, the gas consists of carbon dioxide, water vapor, oxygen, and a diluent, and is oxidizing. Because there is a sharp voltage difference at the transfer point from reducing to oxidizing gas, the oxygen sensor described in reference to FIG. 1 may be used to indicate whether a gas mixture being measured is oxidizing or reducing in addition to indicating the partial pressure or mol fraction of molecular oxygen in the mixture in accordance with Equation 1.

With this background systems which are capable of determining the constituents of a gas mixture of carbon monoxide, carbon dioxide, oxygen, water vapor, hydrogen and a diluent may be understood. Although the systems are similar structurally, there is some variance in function, operation and measuring components, depending upon whether the system is designed to provide continuous analysis or whether the system is designed to analyze distinct batches of such a gas mixture. Therefore, the systems are discussed separately.

A system for measuring a continuous gas mixture flow is shown in FIG. 4. The gas which is to be analyzed is represented by an arrow 80 and is admitted through a coupling or tubing 81 to a diverting valve 82. A portion of the gas is diverted to an oxygen sensor 83 constructed in accordance with FIG. 1 and the potential produced across the sensor electrodes, $E_{83}$, is measured by a voltmeter 84. Then, that portion of the gas may be exhausted from the oxygen sensor 83 as designated by an arrow 85.

The remaining portion of the gas passes through a flowmeter 86. From the flowmeter 86 the gas is directed through an oxygen pump 87, energized by a current source 90, and constructed in accordance with FIG. 2. After the oxygen pump 87 has varied the gas composition, the gas flows through another oxygen sensor 91 and then is exhausted as represented by an arrow 92. The potential from the oxygen sensor 91, $E_{91}$, is measured by a voltmeter 93 and is coupled to a bias control circuit 94 that determines the current, I, generated by the current source 90, the current being measured by a current sensing means such as an ammeter 95.

If the gas being analyzed is an oxidizing mixture, then the voltmeter 84 indicates an oxygen sensor output voltage $E_{83}$ as illustrated on the graph in FIG. 5. The voltage is minimal because the $O/CH$ ratio of an oxidizing gas is large. Assuming that each oxygen sensor is operated at 850° C., Equation 1 indicates the molecular oxygen content of the system. Further, the gas composition may be defined in terms of mol fractions by (2) $\quad X_{CO_2} + X_{H_2O} + X_{O_2} + X_{diluent} = 1$ where $X_{CO_2}$, $X_{H_2O}$ and $X_{diluent}$ are the mol fractions of the carbon dioxide, water vapor and diluent constituents respectively. As there are four unknowns in an oxidizing gas mixture defined by Equation 2, four equations including Equations 1 and 2 are required. Knowing the $C/H$ ratio of the gas, the following equation defines a third oxidizing gas relationship:

(3) $\quad \dfrac{C}{H} = \dfrac{X_{CO_2}}{2X_{H_2O}}$

If proper operating parameters are utilized, the oxygen pump 87 and the oxygen sensor 91 provide sufficient information to solve a fourth equation. In accordance with these parameters, the oxygen pump 87 is energized to cause a predetermined change in the gas composition. To accomplish this variation meaningfully, the bias control circuit 94 energizes the current source 90 so that the composition of the gas mixture sensed by the oxygen sensor 91 causes the voltmeter 93 to register a constant voltage $E_{91}$.

As the particular circuitry involved in the bias control circuit 94 and the current source 90 form no part of this invention and as such circuits are well known to those skilled in the art, no detailed discussion is included herein. Suffice it to say that two input voltages are fed into the bias control circuit 94; the output voltage from the oxygen sensor 91 and a fixed voltage, commonly referred to as a set point voltage. If the set point voltage is set to be equal to $E_{91}$, the bias control circuit 94 controls the current generated from the current source 90 so that the oxygen pump 87 changes the gas mixture composition sufficiently to cause the output voltage at the oxygen sensor 91 to be constant and equal to $E_{91}$.

In accordance with this discussion the bias control circuit 94 is set so that the oxygen pump 87 removes sufficient oxygen from the gas being analyzed to produce a reducing exit gas. Therefore, if oxygen is removed by the oxygen pump 87, the oxygen sensor output voltage $E_{91}$, recorded by the voltmeter 93, will be greater than the voltage $E_{83}$ as shown in FIG. 5. At this voltage the gas being exhausted from the oxygen pump 87 consists almost entirely of carbon monoxide, hydrogen and diluent. While other operating points defined by the other output voltages from the oxygen sensor 91 may be used, this particular area in the knee of the curve provides most accurate results. Furthermore, it allows a relatively simple equation to be defined as:

(4) $\quad X_{CO_2} + X_{H_2O} + 2X_{O_2} = 7.47 I/\dot{V}$ where I is the current energizing the oxygen pump 87 in amperes and V is the volumetric flow rate of the gas as measured by the flowmeter 86 in standard cc./min. Therefore, Equations 1 through 4 allow the exact composition of the gaseous mixture to be determined.

A similar analysis occurs when a continuous flow of reducing gas is admitted to the system of FIG. 4. A reducing gas may be defined by (5) $\quad X_{CO} + X_{CO_2} + X_{H_2} + X_{H_2O} + X_{diluent} = 1$ So, five unknowns exist requiring five equations. In such a mixture there is sufficient molecular oxygen to activate the oxygen sensor 83, but the quantities are so small as to make the mol fraction of molecular oxygen insignificant in Equation 5. However, as the oxygen sensor 83 is energized, the ratio of water vapor to hydrogen and the ratio of carbon dioxide to carbon monoxide can be defined as follows:

(6) $\quad \log\left[\dfrac{X_{H_2O}}{X_{H_2O}}\right] = \frac{1}{2}\log\left[P_R(X_{O_2})_R\right] + E_{83}/k + k_2$ and (7) $\quad \log\left[\dfrac{X_{CO_2}}{X_{CO}}\right] = \frac{1}{2}\log\left[P_R(X_{O_2})_R\right] + E_{83}/k + k_3$ where $k_2$ and $k_3$ are constants related to the equilibrium constants for the formation of water vapor, carbon monoxide and carbon dioxide. The carbon to hydrogen ratio, a known quantity, can be defined as:

(8) $\quad \dfrac{C}{H} = \dfrac{X_{CO} + X_{CO_2}}{2X_{H_2} + 2X_{H_2O}}$

If the bias control circuit 94 is programmed to energize the oxygen pump 87 so that oxygen is pumped into the gas stream to cause the exit gas represented by the arrow 92 to be neutral and composed almost entirely of carbon dioxide, water vapor and diluent, the voltage $E_{91}$ is in a rapidly changing portion of the curve in FIG. 6 and the following relationship exists:

(9) $\quad X_{CO} + X_{H_2} = 7.47 I/\dot{V}$

Equations 5, 6, 7, 8 and 9 serve to provide sufficient equations to solve each unknown. Therefore, the system presented in FIG. 4 is capable of determining the exact composition of reducing and oxidizing gas mixtures having constituents taken from the group consisting of carbon monoxide, carbon dioxide, oxygen, hydrogen, water vapor and a diluent. It will also be obvious to those skilled in the art that the oxygen sensor 83, the bias control circuit 94, the oxygen sensor 91 and current source 90 may all be interconnected in an electronic system including a COMPUTER, as shown in phantom, whereby the bias control circuit 94 set point and the magnitude and polarity of current from the current source 50 are automatically controlled by the output voltage at the oxygen sensor 83. This provides a completely automatic system which, with an appropriate READOUT energized by the COMPUTER, can determine and display the constituents.

The gas analysis system illustrated in FIG. 4 can be modified to provide analysis when defined volumetric samples or batches are admitted. Because batches are being analyzed the flowmeter 86 in FIG. 4 can be eliminated, as may the bias control circuit 94 shown in FIG. 4. A recorder for indicating the voltage output of the second oxygen sensor as a function of time is substituted for bias control circuit 94 and the voltmeter 93. With this modification in instrumentation connected to the basic analysis system, a batch analysis system schematically illustrated in FIG. 7 results. A gas sample to be analyzed represented by an arrow 95 is admitted through a coupling or tubing 96 to a diverter valve 97. A small portion of the gas is diverted to an oxygen sensor 100 constructed in accordance with FIG. 1, the output voltage, $E_{100}$, being measured by a voltmeter 101. That portion of the gas sample may thereafter be exhausted from the oxygen sensor 100 as designated by an arrow 102.

Substantially all the sample gas enters an oxygen pump 103 energized by a constant current source 104, the oxygen pump 103 being constructed in accordance with FIG. 2. After the oxygen pump 103 varies the gas composition completely from a reducing to neutral gas mixture or from an oxidizing to reducing gas mixture as indicated by the voltage output of any oxygen sensor 105, it is exhausted as indicated by an arrow 106. As the oxygen pump modifies the gas composition, the output potential, $E_{105}$, produced by the oxygen sensor 105 will vary and this is recorded as a function of time on a recorder 107 coupled to the output termials of the oxygen sensor 105. Two examples of the voltage plots provided the record 107 are shown in FIGS. 8 and 9, representing oxidizing and reducing gas samples, respectively.

First, referring to FIG. 8 and the analysis of an oxidizing gas sample, when the sample initially enters the oxygen pump 103 as an oxidizing gas, the oxygen sensor 105 produces an output voltage which is of a minimal value as will be obvious from analysis of FIG. 3. Assuming that the current source 104 energizes the oxygen pump 103 at a constant current to transfer oxygen from the batch, the oxygen content decreases at a constant rate causing the $O/CH$ ratio to decrease so that with time the oxidizing gas becomes neutral, at which point there is a rapid voltage rise in the voltage $E_{105}$. Thereafter, the rate of voltage increase decreases, indicating that a reducing gas composition is now present in the oxygen pump 103. Continued pumping of oxygen ions from the gas sample reduces the $O/CH$ ratio even further until a second sharp voltage increase occurs after which a maximum voltage is reached. This last maximum voltage signifies removal of oxygen to a point where the gas mixture consists substantially of carbon monoxide, molecular hydrogen and the diluent gas. The time required to obtain this point is determined from the recorder output.

Normally, the modification of the gas will be stopped prior to complete oxygen removal to avoid overloading the system. For example, if the total time required for complete removal is decreased by 1% or 2%, no significant errors are introduced to the output readings. Where the errors are significant, it is possible to apply calibration procedures to overcome the inaccuracies.

The system in FIG. 7 provides indication of the constant current "I" amperes and the time "t" in seconds required for complete titration. It is also possible to measure the active volume "V" of the oxygen pump and oxygen sensor. When these readings are taken, the following relationship exists:

$$(10) \quad \frac{X_{CO_2}}{1-X_{O_2}} + \frac{X_{H_2O}}{1-X_{O_2}} + 2X_{O_2} = .125 \left[\frac{T'}{293}\right] \alpha It/V$$

where $T'$ is the oxygen pump temperature, in degrees Kelvin, $\alpha$ is an experimentally determined correction factor with a value of unity or less and which is dependent upon the titration time. Equation 10 may then be combined with Equations 1, 2, and 3 to determine the composition of the gas mixture.

A similar analysis is used when the gas represented by the arrow 95 in FIG. 7 is a reducing gas. In this case, the oxygen sensor 100 indicates a relatively high voltage as will be obvious by an analysis of FIG. 3. In accordance with the prior discussion, the current source 104 is again energized to produce a constant current in a direction to pump oxygen ions into the gas sample.

As the oxygen is pumped into the gas sample, the $O/CH$ ratio of the gas increases so the voltage output of the oxygen sensor 105 decreases. As in continuous analysis, the sample is subjected to oxygen pumping until sufficient oxygen has been added to convert the reducing constituents to oxidizing constituents without permitting significant quantities of molecular oxygen to exist so that a neutral gas results.

The decrease in the oxygen sensor potential $E_{105}$ is again recorded as a function of time to produce the plot shown in FIG. 9. The measurements of time required to produce a neutral gas mixture, the current energization level and the predetermined active sample volume are then related to the mol fractions of carbon monoxide and hydrogen by $$(11) \quad X_{CO} + X_{H_2} = .125 \left[\frac{T'}{298}\right] \alpha It/V$$

By utilizing Equation 11 in combination with Equations 5 through 8, the constituent analysis of the sample can be computed. Therefore, the system illustrated in FIG. 7, like the system illustrated in FIG. 4, analyzes defined samples of either oxidizing or reducing gases. As also discussed with reference to FIG. 4, the system of FIG. 7 can be modified so that the output from the oxygen sensor 100, the current source 104, and the oxygen sensor 105 are fed into a COMPUTER to produce a display on a READOUT for each constituent.

Titration is defined as the analytical process of successively adding measured amounts of reagent to a known sample volume or known sample weight until a desired end point is reached. In both systems shown in FIGS. 4 and 7, the reagent is equivalent to the oxygen transferred as oxygen ions through the electrolyte of the oxygen pump 87, and the end point is determined either by the setting of the bias control in the system of FIG. 4 or in substantially completing transfer as in the system of FIG. 7. Therefore, the oxygen pump 87 and oxygen sensor 91 with its associated control equipment in FIG. 4 and the oxygen pump 103 and oxygen sensor 105 together with its associated control equipment in FIG. 7 titrate the gas sample in the classical sense. Both embodiments of the gas analysis system initially analyze the gas sample, titrate the gas sample and, with measurements from the initial analysis and the titration process, determine the constituents of the gas mixture in terms of mol fractions.

In each of the system embodiments described above, separate oxygen sensors and oxygen pumps are disclosed. However, it is possible to combine the sensors and pumps in a single element without greatly modifying either system. Such a combination is shown in FIG. 10 wherein a solid oxygen-ion electrolyte tube 110 has gas directed therethrough by means of couplings 111 and 112. An inner electrode 113 extending substantially along the length of the electrolyte tube 110 is composed of porous platinum and is connected to a terminal 114 by a lead 115. Three spaced electrodes 116, 117, and 118 are deposited on the external surface of the electrolyte tube 110. Each electrode is coupled to a terminal by a lead, the electrodes 116, 117, and 118 being coupled to terminals 120, 121, and 122 by leads 123, 124, and 125, respectively. The electrode 116 in combination with the internal electrode 113 serves to replace the oxygen sensor 83 in FIG. 4 and the oxygen sensor 100 in FIG. 7. The electrodes 117 and 118 in combination with the inner electrode 113 replace the oxygen pump 87 and the oxygen sensor 91 in FIG. 4 and the oxygen pump 103 and oxygen sensor 105 in FIG. 7. For continuous flow analysis, the flowmeter 86 in FIG. 4 could be located upstream from the external electrode 116 and the internal electrode 113. Therefore, the lead 114 would be a common lead connected to circuitry equivalent to the voltmeter 84, the current source 90 and the bias control circuit 94 in FIG. 4 and the voltmeter 101, the current source 104, and the recorder 107 in FIG. 7. The terminal 120 would be adapted to be connected to a voltmeter or other responsive device equivalent to the voltmeters 84 and 101 in FIGS. 4 and 7, respectively. Similarly, the terminal 121 would be adapted to be connected to a current source while the terminal 122 would be adapted to be connected to a bias control circuit or recorder equivalent to those elements shown in FIGS. 4 and 7. Another embodiment of a combination oxygen sensor and pump could be constituted by eliminating the initial oxygen sensor comprising the electrode 116 and a portion of the inner electrode 113 in FIG. 10 so that a single oxygen pump and oxygen sensor would result.

In summary, this invention is embodied in a system which is capable of accurately analyzing the composition of a gaseous mixture composed of constituents taken from the group consisting of carbon dioxide, carbon monoxide, oxygen, hydrogen, water vapor, and an inert diluent. This is done by analyzing the molecular oxygen content of the gas being analyzed and then titrating the gas. The titration information is then combined with the initial gas analysis information to accurately determine normally, in terms of mol fractions, the constituent content of the gas mixture. It will be obvious to those ordinarily skilled in the art that many modifications may be made to a system for providing gas analysis without departing from the invention. Various materials, alternate sensor and system constructions and diverse information processing means may all be substituted without departing from the true spirit and scope of this invention.

What is claimed as new and desired to be secured by Letters Patent fo the United States is:

We claim:

1. A system for constituent analysis of a gas mixture, the constituents being taken from the group consisting of carbon monoxide, carbon dioxide, hydrogen, oxygen, water vapor, and an inert diluent comprising:
   (a) first solid oxygen-ion electrolyte oxygen sensing means for analyzing the oxygen content of the gas mixture;
   (b) gas titration means including solid oxygen-ion electrolyte oxygen-ion pump means and a second solid oxygen-ion electrolyte oxygen sensing means serially connected;
   (c) means for directing a portion of the gas mixture to said pump means and said second oxygen sensing means, and
   (d) utilization means connected to said first oxygen sensing means and said gas titration means to cause titration of the gas mixture portion, said utilization means being responsive to said first oxygen sensing means and said titration means for providing the constituent analysis.

2. A system as recited in claim 1 wherein the gas mixture to the system is a constant flowing mixture, the system additionally including a flowmeter for measuring gas flow into said titration means, said flowmeter being operably connected to said utilization means.

3. A system as recited in claim 2 wherein said utilization means comprises:
   (i) first monitoring means responsive to said first oxygen sensing means;
   (ii) means for energizing said oxygen pump means;
   (iii) control means responsive to said first monitoring means for controlling said energizing means to cause titration of the gas sample; and
   (iv) computer means responsive to said first oxygen sensing means, said flowmeter means and said energizing means for analyzing the gas mixture.

4. A system as recited in claim 3 wherein the gas mixture is oxidizing with constituents being taken from the group consisting of carbon dioxide, oxygen, water vapor, and an inert diluent, said first oxygen sensing means including:
   (i) a pair of electrode means spaced by a stabilized zirconia electrolyte and affixed thereto, said electrode means being operably connected to said computer means; and
   (ii) means for directing a reference gas having a known mol fraction of oxygen $(X_{O_2})_R$ and total pressure $P_R$ to one electrode, the gas mixture being directed to the other electrode, the gas mixture mol fraction of oxygen being $(X_{O_2})_S$ and total pressure being $P_S$, said first oxygen sensing means being adapted to produce a potential E between said electrodes in the presence of said gases, said computer means being adapted to use $$\log[P_S(X_{O_2})_S] = \log[P_R(X_{O_2})_R] + k_1 E$$

as an analyzing equation where $k_1$ is a constant.

5. A system as recited in claim 4 wherein said oxygen pump means and second oxygen sensing means each has electrodes affixed to and spaced by a stabilized zirconia electrolyte, said flowmeter being adapted to produce an output $\dot{V}$, and said energizing means being connected to said oxygen pump means electrodes to energize said oxygen pump means with a current I, the mol fractions of carbon dioxide and water vapor in the gas mixture being $(X_{CO_2})$, said computer being adapted to use $$X_{CO_2} + X_{H_2O} + 2X_{O_2} = k_2 I / \dot{V}$$

as an analyzing equation wherein $k_2$ is a constant.

6. A system as recited in claim 3 wherein the gas mixture is reducing, the constituents being taken from the group consisting of carbon monoxide, carbon dioxide, hydrogen, water vapor, and an inert diluent, said first oxygen sensing means including:
   (i) a pair of electrode means spaced by a stabilized zirconia electrolyte and affixed thereto, said electrode means being operably connected to said computer means; and
   (ii) means for directing a reference gas having a known mol fraction of oxygen $(X_{O_2})_R$ and total pressure $P_R$ to one electrode, the gas mixture being directed to the other electrode to produce a potential E between said electrodes in the presence of said gas, said computer means being adapted to use $$\log\left[\frac{X_{H_2O}}{X_{H_2}}\right] = \log[P_R(X_{O_2})_R] + k_3' E + k_3''$$

and $$\log\left[\frac{X_{CO_2}}{X_{CO}}\right] = \log[P_R(X_{O_2})_R] + k_4' E + k_4''$$

as two analyzing equations and $k_3'$, $k_3''$, $k_4'$, and $k_4''$ are constants.

7. A system as recited in claim 6 wherein said oxygen pump means and second oxygen sensing means each have electrodes affixed to and spaced by a stabilized zirconia electrolyte, said flowmeter being adapted to produce an output $\dot{V}$, and said energizing means being connected to said oxygen pump means electrodes to energize said oxygen pump means with a current I, said computer being adapted to use $X_{CO} + X_{H_2} = k_2 I / \dot{V}$ as one analyzing equation where $k_2$ is a constant.

8. A system as recited in claim 1 wherein the gas mixture to the system is a defined sample and wherein said second oxygen sensing means is adapted to produce a voltage output in response to the gas sample titration, said system additionally comprising means for recording said second oxygen sensing means output voltage as a function of time.

9. A system as recited in claim 8 wherein said utilization means comprises:
   (i) first monitoring means being adapted to be responsive to said first oxygen sensing means;
   (ii) means for energizing said oxygen pump means in response to said first oxygen sensing means to titrate the gas sample; and
   (iii) computer means responsive to said first and second oxygen sensing means and said oxygen pump means energization level for analyzing the gas mixture.

10. A system as recited in claim 9 wherein the gas mixture is oxidizing with constituents taken from the group consisting of carbon dioxide, oxygen, water vapor, and an inert diluent, said first oxygen sensing means including:
(i) a pair of electrode means spaced by a stabilized zirconia electrolyte and affixed thereto, said electrode means being operably connected to said computer means; and
(ii) means for directing a reference gas having a known mol fraction of oxygen $(X_{O_2})_R$ and total pressure $P_R$ to one electrode, the gas sample being directed to the other electrode, the sample gas mol fraction of oxygen being $(X_{O_2})_S$ and total pressure being $P_S$, said first oxygen sensing means being adapted to produce a potential E between said electrodes in the presence of said gases, said computer means being adapted to use $$\log\ [P_S(X_{O_2})_S] = \log\ [P_R(X_{O_2})_R] + k_1 E$$

as an analyzing equation where $k_1$ is a constant.

11. A system as recited in claim 10 wherein said oxygen pump means and second oxygen sensing means each have electrodes affixed to and spaced by a stabilized zirconia electrolyte, said oxygen pump means being adapted to titrate a given sample gas volume V and said recording means being adapted to indicate the titration time $t$, said energizing means being connected to said oxygen pump means electrodes to energize said oxygen pump means with a constant current I, the mol fraction of carbon dioxide and water vapor in the sample being $X_{CO_2}$ and $X_{H_2O}$, said computer means being adapted to use $$\frac{X_{CO_2}}{1-X_{O_2}} + \frac{X_{H_2O}}{1-X_{O_2}} + 2X_{O_2} = k_5 \alpha It/v$$

as one analyzing equation where $k^5$ is a constant and $\alpha$ is a quantity depending on $t$.

12. A system as recited in claim 9 wherein the gas mixture is reducing with constituents taken from the group consisting of carbon monoxide, carbon dioxide, hydrogen, water vapor, and an inert diluent, said first oxygen sensing means including:
(i) a pair of electrode means spaced by a stabilized zirconia electrolyte and affixed thereto, said electrode means being operably connected to said computer means; and
(ii) means for directing a reference gas having a known mol fraction of oxygen $(X_{O_2})_R$ and total pressure $P_R$ directed to one electrode, the gas sample being directed to the other electrode to produce a potential E between said electrodes in the presence of said gases, said computer means being adapted to use $$\log\left[\frac{X_{CO_2}}{X_{CO}}\right] = \tfrac{1}{2} \log\ [P_R(X_{O_2}] + k_3' + k_3''$$

and $$\log\left[\frac{X_{H_2O}}{X_{H_2}}\right] = \tfrac{1}{2} \log\ [P_R(X_{O_2})_R] + k_4' E + k_4''$$

as two analyzing equations where $k_3'$, $k_3''$, $k_4'$, and $k_4''$ are constants.

13. A system as recited in claim 12 wherein said oxygen pump means and second oxygen sensing means each have electrodes affixed to and spaced by a stabilized zirconia electrolyte, said oxygen pump means being adapted to titrate a given sample gas volume V and said recording means being adapted to indicate the titration time $t$, said energizing means being connected to said oxygen pump means electrodes to energize said oxygen pump means with a constant current I, the mol fractions of carbon monoxide and hydrogen being $X_{CO}$ and $X_{H_2}$, said computer means being adapted to use $$X_{CO} + X_{H_2} = k_5\ \alpha It/V$$

as an analyzing equation with $k_5$ as a constant and $\alpha$ as a quantity dependent on the titration time $t$.

14. A system as recited in claim 1 wherein said oxygen pump means and said second oxygen sensing means are formed of a common electrode affixed to one side of a stabilized zirconia electrolyte and a pair of spaced electrodes affixed to the other side of said electrolyte overlying said common electrode, said electrodes being adapted for connection to said utilization means.

15. A system as recited in claim 14 additionally comprising a fourth electrode affixed to said other electrolyte side and spaced from both of said pair of said electrodes, whereby one of said pair of electrodes is a center electrode, said electrodes being adapted for connection to said utilization means to cause said electrolyte, said common electrode and said center electrode to constitute said oxygen pump means.

16. A method for determining the composition of a gas mixture with constituents taken from the group consisting of carbon monoxide, carbon dioxide, oxygen, hydrogen, water vapor, and an inert diluent comprising the steps of:
(a) obtaining a sample of the gas mixture;
(b) analyzing a sample with a first solid oxygen-ion electrolyte oxygen sensor to obtain an output voltage therefrom;
(c) titrating the sample with an electrically energized solid oxygen-ion electrolyte oxygen pump means and a second solid oxygen-ion electrolyte oxygen sensor; and
(d) measuring input power to the oxygen pump means and the first oxygen sensor output voltage and monitoring the second oxygen sensor output voltage to determine the total oxygen-ion transfer and thereby obtain the mol fraction of each constituent in the gas mixture.

17. A method for determining the composition of a gas mixture as recited in claim 16 wherein the gas mixture is constantly flowing, comprising the additional step of measuring the flow rate of the gas sample being titrated.

18. A method for determining the composition of a gas mixture as recited in claim 16 wherein a defined sample of the gas mixture is being analyzed comprising the additional step of measuring the time required to complete titration of the gas sample.

References Cited

UNITED STATES PATENTS

| | | | |
|---|---|---|---|
| 3,216,911 | 11/1965 | Kronenberg | 204—1 |
| 3,297,551 | 1/1967 | Alcock | 204—1 |
| 3,347,767 | 10/1967 | Hickam | 204—195 |
| 3,359,188 | 12/1967 | Fischer | 204—1 |
| 3,378,478 | 4/1968 | Kolodney et al. | 204—195 |
| 3,400,054 | 9/1968 | Ruka et al. | 204—1 |
| 3,403,090 | 9/1968 | Tajiri et al. | 204—195 |
| 3,442,773 | 5/1969 | Wilson | 204—1 |

JOHN M. MACK, Primary Examiner

G. L. KAPLAN, Assistant Examiner

U.S. Cl. X.R.

23—232, 254; 204—195